(12) United States Patent
Gupta

(10) Patent No.: US 8,861,860 B2
(45) Date of Patent: Oct. 14, 2014

(54) COLLECTION AND USE OF MONITORED DATA

(75) Inventor: Nisheeth Gupta, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 21 days.

(21) Appl. No.: 13/300,903

(22) Filed: Nov. 21, 2011

(65) Prior Publication Data

US 2013/0129217 A1    May 23, 2013

(51) Int. Cl.
*G06K 9/00* (2006.01)
*G06K 9/18* (2006.01)
*G06K 9/64* (2006.01)
*G06K 9/68* (2006.01)
*G06K 9/32* (2006.01)

(52) U.S. Cl.
CPC ............ *G06K 9/00523* (2013.01); *G06K 9/325* (2013.01)
USPC .......................... 382/182; 382/100; 382/217

(58) Field of Classification Search
None
See application file for complete search history.

(56) References Cited

U.S. PATENT DOCUMENTS

| | | | |
|---|---|---|---|
| 7,628,730 B1* | 12/2009 | Watterson et al. | 482/8 |
| 7,949,191 B1* | 5/2011 | Ramkumar et al. | 382/209 |
| 2001/0049470 A1* | 12/2001 | Mault et al. | 600/300 |
| 2002/0111541 A1* | 8/2002 | Bibl et al. | 600/300 |
| 2007/0005653 A1* | 1/2007 | Marsh | 707/104.1 |
| 2007/0011140 A1* | 1/2007 | King et al. | 707/3 |
| 2008/0091713 A1* | 4/2008 | Candelore et al. | 707/103 R |
| 2008/0126318 A1* | 5/2008 | Frankovitz | 707/3 |
| 2009/0144369 A1* | 6/2009 | Brown | 709/205 |
| 2009/0192813 A1* | 7/2009 | Gejdos et al. | 705/1 |
| 2009/0219159 A1* | 9/2009 | Morgenstern | 340/573.1 |
| 2009/0245803 A1* | 10/2009 | Garner et al. | 398/106 |
| 2009/0247219 A1* | 10/2009 | Lin et al. | 455/556.1 |
| 2010/0191807 A1* | 7/2010 | Brown et al. | 709/204 |
| 2010/0262630 A1* | 10/2010 | Sangster et al. | 707/805 |
| 2010/0293267 A1* | 11/2010 | Ribak et al. | 709/224 |
| 2011/0267459 A1* | 11/2011 | Choi | 348/135 |
| 2012/0117232 A1* | 5/2012 | Brown et al. | 709/224 |
| 2012/0296455 A1* | 11/2012 | Ohnemus et al. | 700/91 |

OTHER PUBLICATIONS

Gupta, N. and Jilla, S., Digital Fitness Connector: Smart Wearable System, 2011, First International Conference on Informatics and Computational Intelligence, pp. 118-121.*

* cited by examiner

*Primary Examiner* — Stephen R Koziol
*Assistant Examiner* — Jonathan S Lee

(57) ABSTRACT

A device is configured to capture an image of a monitoring device display, perform optical character recognition to identify alphanumeric data in the image, apply a device profile to map each identified alphanumeric datum to a parameter associated with the monitoring device; and store each datum along with its associated parameter.

19 Claims, 4 Drawing Sheets

COLLECTION AND USE OF MONITORED DATA

BACKGROUND INFORMATION

Modern equipment, such as exercise devices, monitor and record a variety of data. For example, exercise devices may record and display the duration of an exercise session, estimated calories burned during the exercise session, steps taken, distance covered, average heart rate, etc. Likewise, various other devices, such as blood pressure monitors, heart rate monitors, insolent monitors, etc. may record and display various data. However, users of devices that record and display data may have difficulty in capturing and storing the data.

DETAILED DESCRIPTION OF PREFERRED EMBODIMENTS

Figure 1:
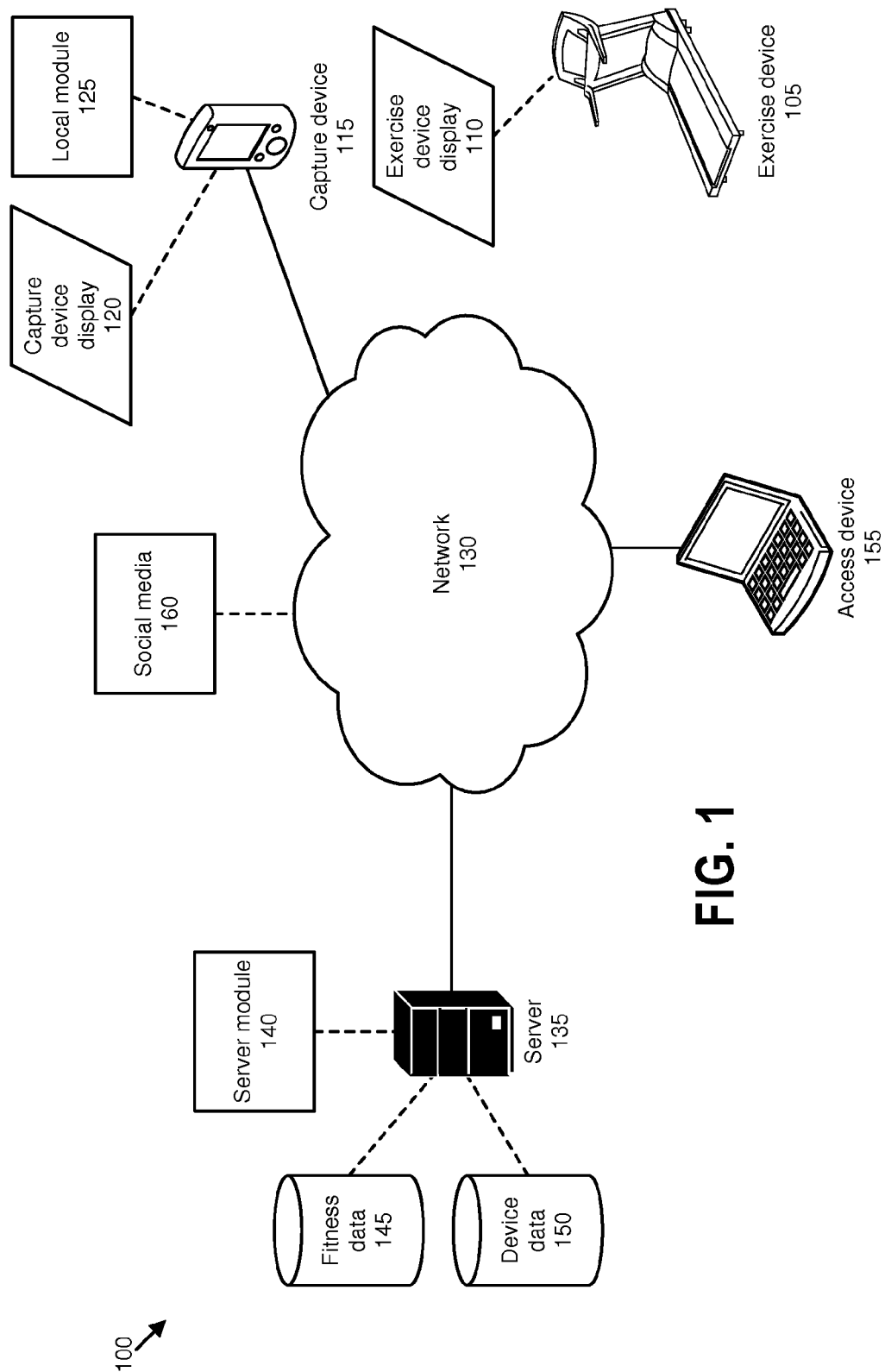
FIG. 1 is a block diagram of an exemplary system for collecting monitored data.

FIG. 1 is a block diagram of an exemplary system 100 for collecting monitored data. The system 100 includes one or more devices, e.g., an exercise device 105, whose functions include one or more monitoring functions, and that gather and display monitor data, e.g., on exercise device display 110. A capture device 115 may be used to capture data displayed on the device display 110, e.g., the capture device 115 may include a camera or the like. The capture device 115 also generally includes a capture device display 120 on which captured data may be displayed according to instructions included in a local module 125.

Further, captured data may be transmitted from the capture device 115, e.g., according to instructions in the local module 125, via a network 130 to a remote server 135. The server 135 may receive the captured data according to instructions in a server module 140. Included in, or associated with, the server 135 is a fitness data store 145 and a device data store 150. The fitness data store 145 includes data received from one or more capture devices 115, while the device data store 150 includes data that may be used by one or more capture devices 115 in capturing data from various devices 105. Data may be accessed from the remote server 135 by an access device 155 and/or published in a variety of ways, e.g., to social media 160.

The exercise device 105 may be any one of a variety of exercise devices, e.g., stationary bicycle, treadmill, stair climber, elliptical trainer, etc. that include a display with one or more alphanumeric data. As mentioned above, although a single exercise device 105 is depicted in FIG. 1, the system 100 may, and generally does, include multiple exercise devices 105. Further, although the system 100 is described with respect to an exercise device 105, other types of monitoring device may be incorporated into the system 100 in lieu of, or in addition to, the exercise device 105. For example, the system 100 could include health monitors such as heart rate monitors, insulin monitors, blood pressure monitors, etc.

The display 110 of the device 105 may include a variety of display mechanisms, such as an LED display, LCD display, etc., whereby alphanumeric data is displayed. For example, a display 110 could include an LED display of device 105 parameters respectively representing an average heart rate, a time duration of an exercise session, a distance traveled, and an estimated number of calories burned, etc.

Capture device 115 is generally a computing device that includes a processor and a memory, as well as a display 120 that provides a graphical user interface (GUI). A local module 125 stored in a memory of the capture device 110 may include instructions executable by the processor of the device 115 for capturing data from exercise device display 110, transmitting data via the network 130, etc. Without limitation, the capture device 115 may be a handheld computing device such as a smart phone, personal digital assistant, etc., and generally includes a camera and also a touch screen allowing a user to interact with the device 115.

Local module 125 generally includes optical character recognition (OCR) software that may be used to analyze an image of displaced display 110 captured by a camera or the like of the capture device 115. For example, OCR software may be used to identify alphanumeric data included in such an image. Such alphanumeric data, as mentioned above, could include device 105 parameters such as an average heart rate, a time duration of an exercise session, a distance traveled, and an estimated number of calories burned, etc.

Network 130 generally includes a packet network, e.g., an Internet protocol (IP) network, and may incorporate one or more of a cellular network, the Internet, a wide area network, a local area network, etc.

The server 135 is generally a computing device having a processor and a memory. A server module 140 may include instructions stored in the memory and executable by the processor. Instructions included in the module 140 may include instructions for receiving data from a capture device 115, e.g., via a network 130, and for storing data in and retrieving data from fitness data store 145 and/or device data store 150. The server 135 and its associated elements 140, 145, and 150, may not be included in every implementation of the system 100. For example, certain operations carried out according to instructions in the server module 140 could be performed by the capture device 115, and moreover, data stores 145 and/or 150 could be included in whole or in part in a memory of the capture device 115.

Fitness data store 145 includes data captured from one or more device displays 110. For example, fitness data store 145 may include data stored in a relational or tabular format, the data organized according to users of the system 100. For each user, data store 145 may store data captured from one or more devices 105. For example, data store 145 may store, for a user, data related to multiple of the user's exercise sessions, including, for each exercise session, data indicating an average heart rate, a number of calories estimated to have been burned, a distance traveled, etc. Further, data store 145 may aggregate such data, e.g., provide an average heart rate, average number of calories estimated to have been burned, average distance traveled, etc. over a number of exercise sessions. Further, module 140 may include instructions for storing, retrieving and/or aggregating data stored in fitness data store 145.

Device data store 150 includes profiles for devices 105. The profiles include maps or templates that provide a guide for interpreting data gleaned from performing OCR on images captured from an exercise device display 110. Different devices 105 may display different types of data and/or may display similar types of data in different locations or formats on a device display 110. Accordingly, profiles included in data store 150 may include coordinates or the like indicating a location or locations in a captured image where a particular datum, or particular data, may be found. One or more profiles may be provided to capture device 115 and used by local module 125 to identify data resulting from an OCR analysis of images captured from exercise device display 110.

The access device 155 is generally a computing device, such as a laptop computer, desktop computer, tablet computer, smart phone, etc., generally including a web browser or the like for accessing the server 135 and obtaining fitness data 145. For example, the server module 140 may include instructions for providing reports including fitness data 145 to an access device 155.

Social media 160 may include social media outlets such as FaceBook, Twitter, and the like. Server module 140 can include instructions for allowing a user of an access device 155, to publish fitness data 145 to various social media. Likewise, local module 125 could include instructions for a user of the capture device 155 to publish fitness data 145 to various social media.

Figure 2:
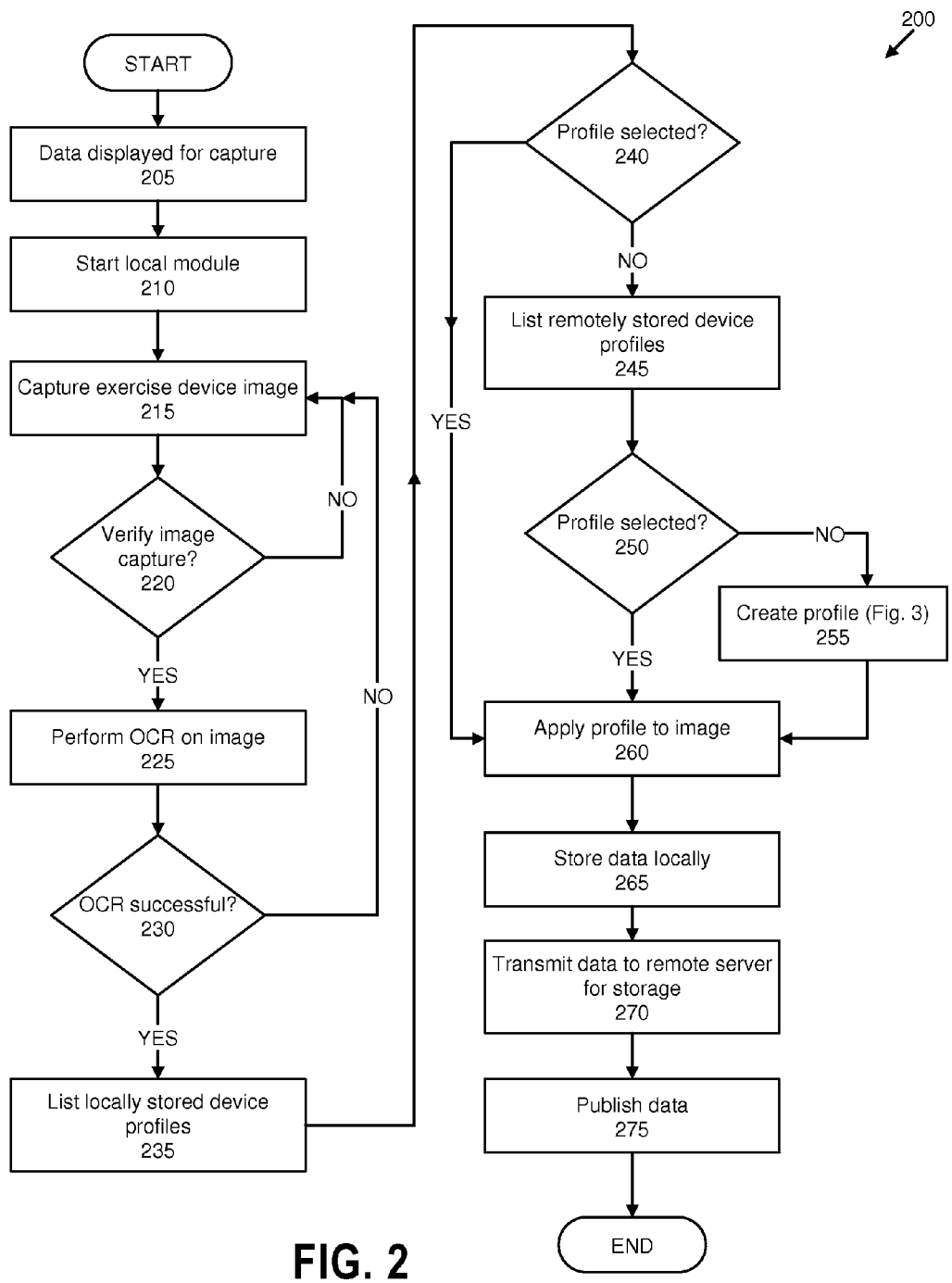
FIG. 2 illustrates an exemplary process for capturing and storing data shown on a device display.

FIG. 2 illustrates an exemplary process 200 for capturing and storing data shown on a device display 110. The process 200 begins in a step 205, in which a device 105 displays data on a display 110 that may be captured by a capture device 115.

Next, in step 210, local module 125 is instantiated on device 115. For example, a user may tap an icon shown on the display 120 and associated with the local module 125, or some other mechanism may be used to instantiate the local module 125.

Next, in step 215, capture device 115, e.g., via a camera or the like included in the device 115, is used to capture data, e.g., in an image, from the device display 110.

Next, in step 220, the local module 125 verifies the data, e.g., the image, captured in step 215. For example, the local module 125 may display the image to a user, and request user input concerning whether the image is verified. For example, a user may verify that all relevant data fields included on the device display 110 have been captured in the image, are readable, etc. Alternatively or additionally, an OCR analysis of the captured image may be performed at this step to determine if readable data values have been captured. In any case, if the captured image cannot be verified, then the process 200 returns to step 215. Otherwise, the process 200 proceeds to step 225.

In step 225, assuming that an OCR analysis was not performed in step 220, local module 125 performs an OCR analysis of the image captured in step 215.

Next, in step 230, local module 125 determines whether the OCR analysis performed in step 225 was successful. For example, the local module 125 may determine if numeric data could be identified from the captured image.

Figure 6:
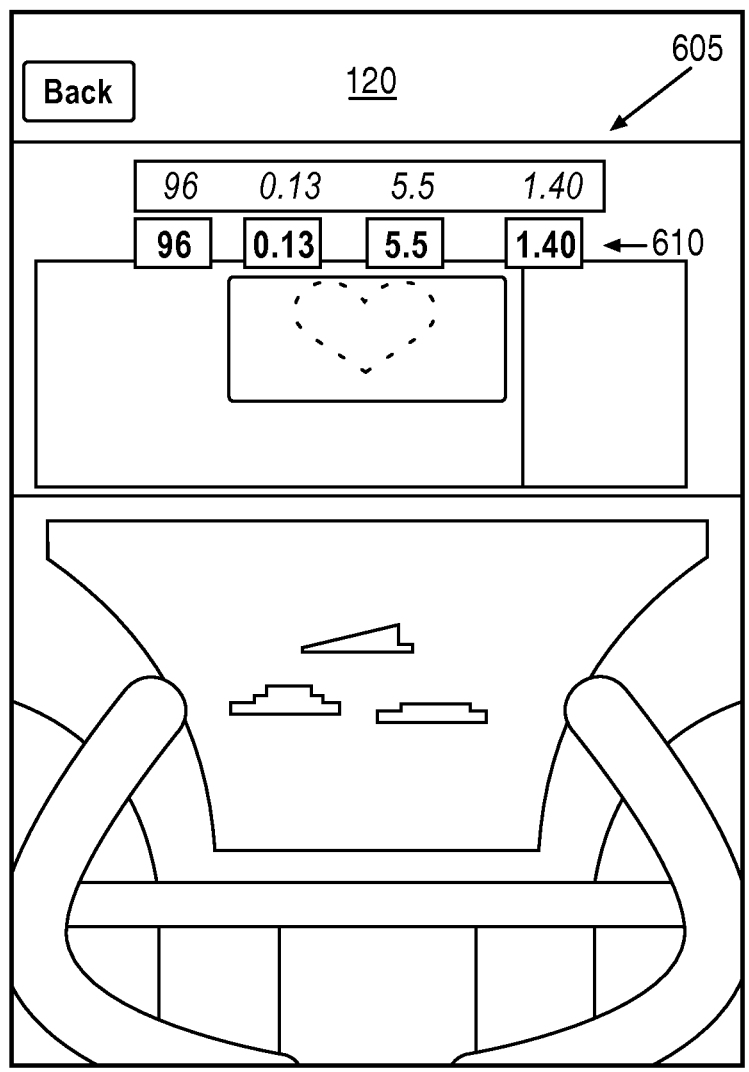

FIG. 6 provides an exemplary illustration of a result of an OCR analysis of a captured image. As can be seen, a display 120 may include an image that shows device data 605, i.e., an image of a display 110 including data provided by the display 110, along with OCR data 610, i.e., in this example, numeric data parsed from the device data 605.

Returning to the process 200, if the OCR analysis is determined to have been successful, then step 235 is executed after step 230. Otherwise, the process 200 returns to step 215.

Figure 4:
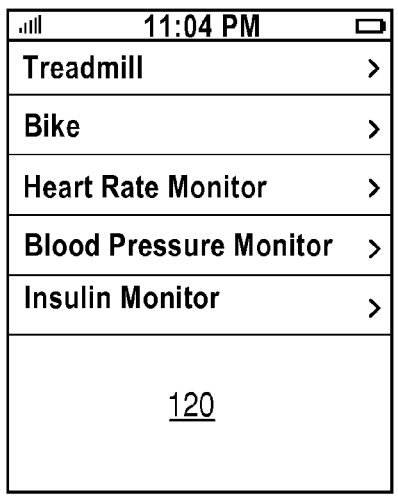
FIG. 4 illustrates an exemplary capture device display listing monitoring and/or exercise device profiles.

In step 235, the local module 125 causes a list of locally stored device 105 profiles, if any, to be listed on the display 120 of the capture device 115. FIG. 4 illustrates an exemplary capture device 115 display 120 listing monitoring and/or exercise device 105 profiles. As mentioned above, a device 105 profile may include data concerning the location and content of data included in a device display 110, e.g., as captured in an image by capture device 115. If no device 105 profiles are stored in a memory of the capture device 115, the process 200 may proceed to step 260 (not shown in FIG. 2).

Next, the local module 125 determines whether a listed device 105 profile was selected in step 235. For example, a user could be prompted for input to select a device 105 profile, or to indicate that the appropriate device 105 profile was not present in the list. If a profile was selected, then the process 200 proceeds to step 260. Otherwise, step 245 is executed next.

In step 245, local module 125 queries the remote server 135 for available device 105 profiles. Accordingly, the server 135 may in turn query the device data store 150, and return a list of device 105 profiles to the requesting capture device 115. In some cases, the local module 125 may query the server 135 for a specific category or subcategory of device 105 profiles, e.g., profiles relating only to treadmills, blood pressure monitors, etc. Such a query could be formulated according to input received from a user in response to step 235. For example, in step 235, in addition to listing locally stored device 105 profiles, the module 125 could also provide a user with an option to indicate a category of device 105 of interest. Then, even if a profile matching the device 105 for which image was captured in step 215 is not present in the memory of the capture device 115, the local module 125 is nonetheless able to narrow its query for device 105 profiles to the server 135. In any case, device 105 profiles responsive to the query from the local module 125, if any, are provided on display 120 in step 245.

Next, in step 250, the module 125 determines whether a device 105 profile listed in step 245 has been selected, e.g., according to user input. If not, the module 125 proceeds to step 255, but otherwise step 260 is executed next.

In step 255, a device 105 profile appropriate to the image captured in step 215 is created. An exemplary process for creating a device 105 profile is discussed in more detail below with respect to FIG. 3. Following step 255, the process 200 proceeds to step 260.

In step 260, the local module 125 applies a device 105 profile selected in step 240 or step 250, or created in step 255, to the image captured in step 215. Accordingly, the local module 125 interprets each numeric datum, e.g., from the data 610 shown in FIG. 6, shown in the image captured in step 215.

Next, in step 265, the local module 125 stores the data interpreted in step 260 in a local memory of the capture device 115. For example, according to a device 105 profile, local module 125 may determine that a first OCR datum relates to an average heart rate, a second OCR datum relates to a duration of exercise session, a third OCR datum relates to a distance traveled, a fourth OCR datum relates to an estimated number of calories burned, etc., and such data may accordingly be stored in a memory of the device 115.

Next, in step 270, local module 125 transmits the data interpreted in step 260 to the server 135, e.g., via the network 130. The server 135 then stores the data in fitness data store 145.

Next, in step 275, a user of the device 115 may opt to publish the data interpreted in step 262 social media 160 or some other outlet. Alternatively or additionally, as mentioned above, data from fitness data store 145 may be published according to inputs to server 135 received from an access device 155.

Following step 275, process 200 ends.

Figure 3:
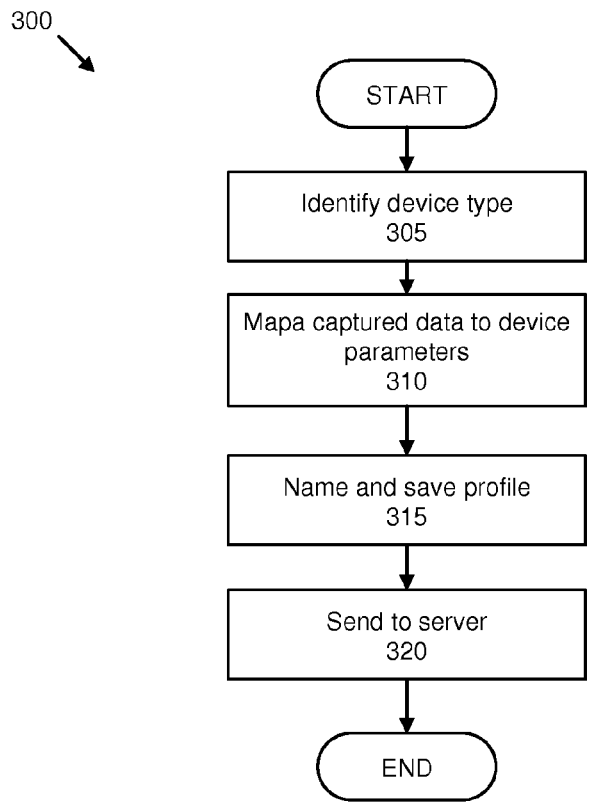
FIG. 3 illustrates an exemplary process for creating a device profile.

FIG. 3 illustrates an exemplary process 300 for creating a device 105 profile. The process 300 begins in a step 305, in which a device type is identified. For example, local module 125 may list various types of devices, e.g., stationary bicycle, treadmill, heart rate monitor, let pressure monitor, etc. on the capture device display 120.

Figure 5:
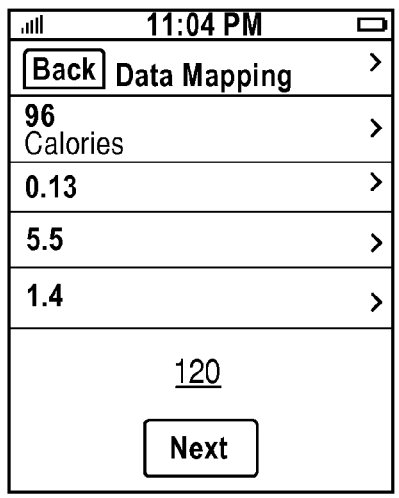
FIG. 5 provides an exemplary illustration of an interface that may be included in a capture device display for performing data mapping FIG. 6 provides an exemplary illustration of a result of an OCR analysis of a captured image.

Next, in step 310, module 125 causes OCR data from an image captured as described above with respect to step 215 of process 200 to be mapped to parameters associated with the device 105. FIG. 5 provides an exemplary illustration of an interface that may be included in the capture device display 120 for performing such mapping. The display 120 shown in FIG. 5 list various numeric values that a user may select for association with various device 105 parameters, e.g., average heart rate, estimated calories burned, duration of exercise session, distance traveled, etc.

Next, in step 315, module 125 names of the profile being created, e.g., according to user input, a naming rule included in the module 125, etc., and saves the profile to a memory of the capture device 115.

Next, in step 320, the module 125 transmits the profile saved in step 315 to the server 135, e.g., via the network 130. The server 135 then saves the profile and device data store 150.

Following step 320, the process 300 ends.

Computing devices such as device 115, server 135, etc. may employ any of a number of computer operating systems, including, but by no means limited to, versions and/or varieties of the Microsoft Windows® operating system, the iOS by Apple Computer, Inc., Android by Google, Inc., the Unix operating system (e.g., the Solaris® operating system distributed by Sun Microsystems of Menlo Park, Calif.), the AIX UNIX operating system distributed by International Business Machines (IBM) of Armonk, N.Y., and the Linux operating system. Computing devices in general may include any one of a number of computing devices, including, without limitation, a computer workstation, a desktop, notebook, laptop, or handheld computer, or some other computing device.

Computing devices such as device 115, server 135, etc. generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein, e.g., data stores 145 and 150, may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above. Database 115 may be any of a variety of known RDBMS packages, including IBMS DB2, or the RDBMS provided by Oracle Corporation of Redwood Shores, Calif.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   instantiating a module of a capture device proximate to a monitoring device for capturing an image presented by a display of the monitoring device;
   capturing the image of the display of the monitoring device;
   performing by the module optical character recognition to identify alphanumeric data in the image;
   presenting a first list of device profiles locally stored on the capture device;

presenting a second list of device profiles remotely stored on a remote device when a device profile is not selected from the first list of device profiles;

applying by the module a device profile associated with the monitoring device to map each identified alphanumeric datum to a monitoring parameter, wherein the device profile is a profile from one of the first and second lists; and storing each datum in association with the mapped monitoring parameter.

2. The method of claim 1, wherein the data and the parameters are stored in a device used to capture the image.

3. The method of claim 1, further comprising transmitting the data and the parameters via a network, wherein the data and the parameters are stored in a remote data store.

4. The method of claim 1, further comprising creating the device profile by accepting user input to associate each datum with one of the device monitoring parameters.

5. The method of claim 4, further comprising saving the device profile in at least one of a device used to capture the image and a remote device.

6. The method of claim 1, the device profile storing the monitoring parameters, and guiding via templates an interpretation of each identified alphanumeric datum based on the monitoring parameters.

7. The method of claim 1, further comprising publishing at least some of the data and parameters to one or more social media outlets.

8. A non-transitory computer-readable medium tangibly embodying computer-executable instructions that when executed by a processor cause the processor to perform:

instantiating a module of a capture device proximate to a monitoring device for capturing an image presented by a display of a monitoring device;

capturing the image of the display of the monitoring device;

performing by the module optical character recognition to identify alphanumeric data in the image;

displaying a first list of device profiles locally stored on the capture device;

displaying a second list of device profiles from a remote device when a device profile from the first list of device profiles is not selected;

applying by the module a device profile selected from one of the first and second lists and associated with the monitoring device to map each identified alphanumeric datum to a monitoring parameter; and storing each datum in association with the mapped monitoring parameter.

9. The medium of claim 8, the instructions further comprising instructions for creating the device profile by accepting user input to associate each datum with one of the device monitoring parameters.

10. The medium of claim 8, the device profile storing the monitoring parameters, and guiding via templates an interpretation of each identified alphanumeric datum based on the monitoring parameters.

11. A system, comprising:
a monitoring device; and a device proximate to the monitoring device including a processor, a memory, and a camera, the device configured to:

instantiate a module stored on the memory for capturing an image presented by a display of the monitoring device;

capture an image of the display of the monitoring device;

perform by the module optical character recognition to identify alphanumeric data in the image;

present a first list of device profiles locally stored on the capture device;

present a second list of device profiles when a device profile from the first list is not selected, wherein the second list of device profiles is remotely stored on a remote device;

apply by the module a device profile associated with the monitoring device to map each identified alphanumeric datum to a monitoring parameter, wherein the device profile associated with the monitoring device is a profile selected from one of the first and second lists; and store each datum in association with the mapped monitoring parameter.

12. The system of claim 11, the device further configured to create the device profile by accepting user input to associate each datum with one of the device monitoring parameters.

13. The system of claim 11, the device profile configured to store the monitoring parameters, and guide via templates an interpretation of each identified alphanumeric datum based on the monitoring parameters.

14. The method of claim 1, each monitoring parameter representing at least one parameter from a set including an average heart rate, a time duration of an exercise session, an exercise distance, and an estimated number of calories burned.

15. The method of claim 1, wherein a piece of exercise equipment includes the monitoring device.

16. The method of claim 1, further comprising requesting a signal indicating that the optical character recognition was verified.

17. The method of claim 1, further comprising receiving a signal indicating that the device profile was selected from one of the first and second lists of device profiles.

18. The method of claim 1, further comprising creating the device profile by:
identifying a monitoring device type;
mapping each identified alphanumeric datum to a respective monitoring parameter of a set of monitoring parameters associated with the monitoring device type; and
naming the device profile according to a received signal.

19. The method of claim 1, further comprising:
aggregating a plurality of first mapped monitoring parameters to provide a first average of the plurality of first mapped monitoring parameters;
aggregating a plurality of second mapped monitoring parameters to provide a second average of the plurality of second mapped monitoring parameters; and
providing the first and second averages to a user of the capture device.

* * * * *